(12) United States Patent
Strasser

(10) Patent No.: US 6,640,580 B1
(45) Date of Patent: Nov. 4, 2003

(54) METHOD FOR PRODUCING LONG DISTANCE ENERGY AND DEVICES THEREFOR

(76) Inventor: Roland Strasser, Im Weidenklingen 11, D-69483 Wald-Michelbach (DE)

( * ) Notice: Subject to any disclaimer, the term of this patent is extended or adjusted under 35 U.S.C. 154(b) by 0 days.

(21) Appl. No.: 09/980,077
(22) PCT Filed: Dec. 2, 1999
(86) PCT No.: PCT/DE99/03861
§ 371 (c)(1), (2), (4) Date: Apr. 22, 2002
(87) PCT Pub. No.: WO00/70269
PCT Pub. Date: Nov. 23, 2000

(30) Foreign Application Priority Data

May 18, 1999 (DE) .......................... 199 22 696

(51) Int. Cl.$^7$ ................................. F25D 11/00
(52) U.S. Cl. .................... 62/437; 62/46.1; 62/46.2; 62/480; 62/48; 62/62; 62/78
(58) Field of Search ................. 62/46.1, 46.2, 62/480, 437, 48, 62, 78, 239

(56) References Cited

U.S. PATENT DOCUMENTS

| | | | | |
|---|---|---|---|---|
| 4,566,282 A | * | 1/1986 | Knoblauch et al. | 62/48 |
| 5,048,301 A | * | 9/1991 | Sabin et al. | 62/101 |
| 5,237,827 A | * | 8/1993 | Tchernev | 62/106 |
| 6,082,118 A | * | 7/2000 | Endrizzi et al. | 62/46.1 |
| 6,109,057 A | * | 8/2000 | Shervington et al. | 62/371 |
| 6,170,269 B1 | * | 1/2001 | Wisniewski | 62/63 |

* cited by examiner

Primary Examiner—William C. Doerrler
Assistant Examiner—Mark Shulman

(57) ABSTRACT

A method is provided, in which directly generated and/or indirectly formed and storable heat energy is stored in a mobile container-like latent-heat storage unit capable of being warehoused and of being delivered, the latent-heat storage unit being transported by means of a transport unit to at least one heat-energy reception unit and being arranged there in suitable form on or in the heat-energy reception unit. The possibility is thus afforded, for the first time, of transporting and utilizing heat energy over relatively long distances flexibly and on demand, but also extremely profitably.

16 Claims, 2 Drawing Sheets

METHOD FOR PRODUCING LONG DISTANCE ENERGY AND DEVICES THEREFOR

Figure 1:
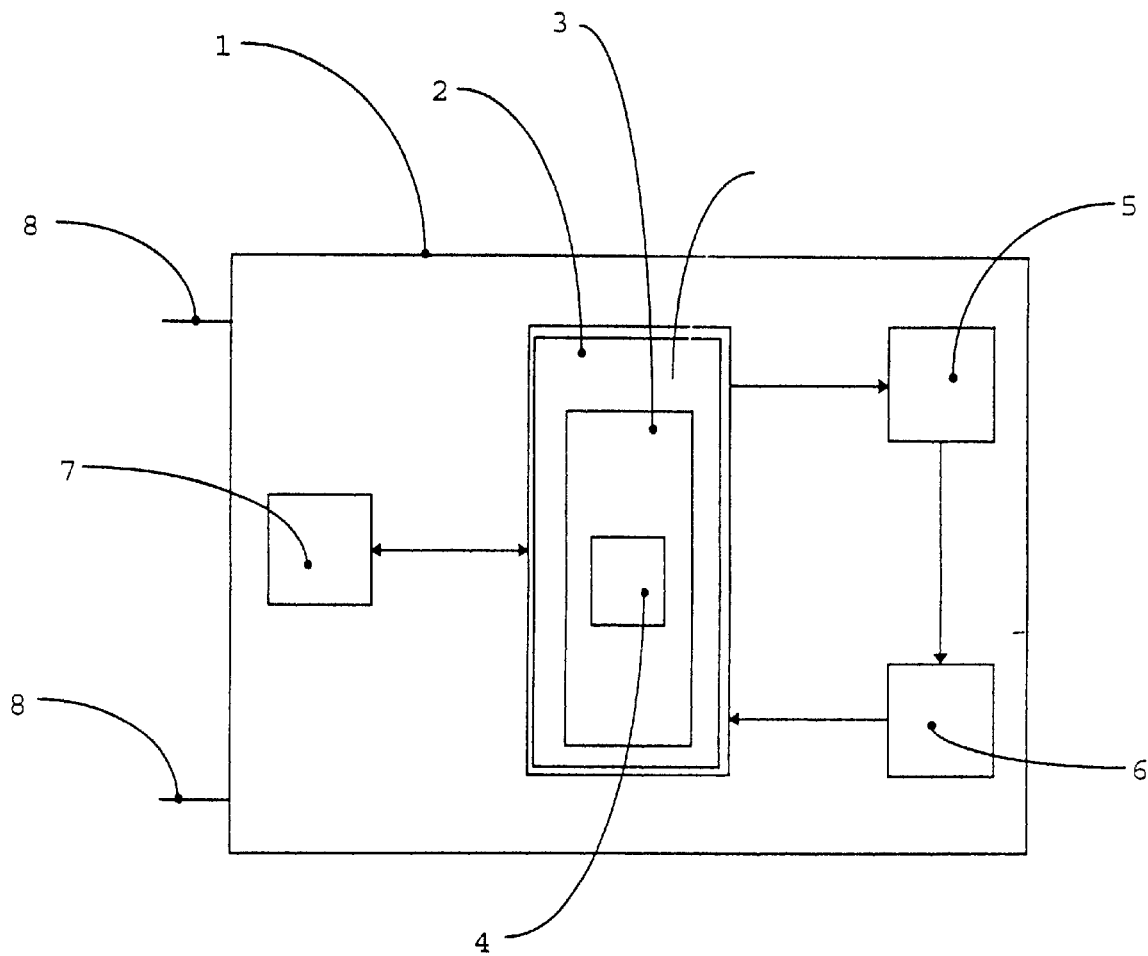

The invention relates to a method for the provision of remote heat energy according to the features of claim 1 and to a latent-heat storage unit as claimed in claim 8 and also to a transport unit as claimed in claim 11.

Systems for the supply of remote heat are known, in which consumers are supplied with heat energy via a pipeline system, for example, for the supply of hot water or for treatment. In this case, as a rule, the heat transfer medium is used is water. The water heated via a heat exchanger transports the heat occurring in a thermal power station, for example in a block-heating power station, or excess industrial process heat to the consumer unit via the pipeline system. In principle, the use of remote heat serves for heat recovery, that is to say it constitutes a measure for the multiple utilization of the enthalpy of a building or a process and thus serves for the effective utilization of the primary energy used.

In the remote transmission of heat, particularly in the case of heat recovery, the problem of heat transport always arises in connection with the profitability of such systems. Pipeline systems used hitherto are suitable only for transport distances of about 40 kilometers for hot water or steam, since the outlay for the necessary insulating measures would then become too high or would rise according to the heat losses. The object on which the invention is based is, therefore, to provide remote heat energy in such a way that the above disadvantages are avoided and both an effective profitable and effective energy-related utilization of remote heat becomes possible.

This object is achieved in an extremely surprising way by means of the features of claims 1,8 and 11.

By a method being provided, in which directly generated and/or indirectly formed and storable heat energy is stored in a mobile container-like latent-heat storage unit capable of being warehoused and being delivered, the latent-heat storage unit being transported by means of a transport unit to at least one heat-energy reception unit and being arranged there in suitable form on or in the heat-energy reception unit, there is, for the first time, the possibility of delivering heat energy over relatively long distances flexibly and on demand, but also in extremely profitable way.

Furthermore, according to the invention, a latent-heat storage unit and a transport unit are claimed, the latent-heat storage unit being designed in the manner of a transport container and at the same time having both standing and transport functionality. Standing and transport functionality means, in this connection, that the latent-heat storage unit according to the invention can be used both transportably and in a stationary situation, that is to say in the standing storage mode or charging mode.

The latent-heat storage unit and the transport unit according to the invention serve preferably for carrying out the method referred to above. By their use, it is possible, for the first time, to supply potential consumers with heat energy not merely to a regional extent. Consequently, with the latent-heat storage unit according to the invention and the transport unit according to the invention and, above all, by the implementation of the method according to the invention, it is possible, for the first time, to break into the monopoly of local heat energy suppliers and create a genuine market for heat energy.

The subclaims relate to developments of the invention.

It proved in an extremely advantageous way, in the invention, to be a particularly positive factor when a latent-heat store of a particular type is used for the storage of heat energy, to be precise a dynamic inorganic latent-heat store. Such latent-heat stores are known in various embodiments. They are designated as dynamic, since the storage medium exhibits essentially no anhydrite formation either as a result of rotation or due to the supply of a heat transfer substance immiscible with the storage medium.

Latent-heat storage units have been used hitherto for the stationary storage of heat energy from solar installations and for the recovery of process heat. With regard to stationary use, the disadvantage of latent-heat stores is that, realistically, they can be designed at most as monthly stores or else as weekly stores. It is therefore necessary for such a store to be charged continuously, for example when it is to be used, in particular, for the all-year supply of heat to a house. On the other hand, the latent-heat store offers substantially larger storage capacity, particularly as compared with sensible stores, for example heated water or a heated solid, so that an inorganic latent-heat store replaces an up to six times larger water store. The method according to the invention, on the one hand, makes use of the advantage of the comparatively high storage capacity and overcomes the disadvantage of the latent-heat store, namely that its storage capacity is still not sufficient for a yearly store or longer. Thus, within the scope of the method according to the invention, a permanent and flexible supply of heat energy, even over relatively long distances, becomes possible.

For this purpose, what are known as autonomous latent-heat storage units are used in an extremely advantageous way. In a particularly advantageous development of the invention, the latent-heat storage unit according to the invention possesses mobility properties which are equivalent to those of a transportable container or silo. To be precise, the inventor succeeded, for the first time, in demonstrating that, if storage media with at least the storage capacities to be found in latent-heat stores are used, heat energy can be delivered in an extremely advantageous way via existing transport means and transport routes with considerable energy-saving effects both as regards the energy balance and with regard to economic efficiency.

In a further advantageous development of the method according to the invention and of the latent-heat storage unit according to the invention, there is advantageously provision, furthermore, for metal hydrates, preferably sodium acetate and/or industrial white oil to be used as storage medium. To be precise, it is known from the relevant literature that, in particular, the salt hydrate sodium acetate, has particularly high transformation enthalpy and also, at a transformation temperature of about 58° C., operates preferably in the temperature range which is highly suitable for heat recovery. This also applies in a comparable way, for example, to the storage medium barium hydroxide, barium hydroxide possessing even higher transformation enthalpy, as compared with sodium acetate, and therefore being suitable for even more efficient storage of heat.

Contrary to hereto existing forms of the supply of remote heat energy, in the method according to the invention it is possible in a simple way to receive heat energy from various heat energy sources and to transport it to where it is used. Even the energy reserves of decentral heat energy generators can be utilized effectively in this way. Moreover, the hitherto cost-increasing monopoly of local heat energy suppliers is brought to an end. Consequently, for the first time, the method provided according to the invention, in an extremely surprisingly simple way, presents the possibility of utilizing, or making available to the consumer for utilization, directly generated heat energy or indirectly emitted waste heat in a form comparable, for example, to that of electrical current. The pipeline-free transport of heat energy according to the invention can thus make a permanent contribution to the efficient utilization of primary energy.

In this connection, it is also true, in particular, that, according to the method, the latent-heat storage unit can be transported in the charged state to various supply units, in order to discharge the stored heat energy to the storage units set up there. However, according to the invention, in a further possible form of energy transfer, the latent-heat storage unit is also connected as a modular store to the supply network of a consumer, in such a way that the modular store is replaced, as required, in the discharged state, by a latent-heat storage unit filled with heat energy.

By virtue of the method according to the invention and of the use of the modular stores according to the invention, it therefore becomes possible, for the first time, to build up profitable decentral heat networks which are simple to handle and which make it unnecessary to equip the buildings with heating systems based on fuel oil or gas. Such decentral heat utilization proves advantageous in many respects. In this regard, it may be stated, for example, that the customer can dispense with keeping a comprehensive energy stock of, for example, several thousand liters of fuel oil. Furthermore, complex burners of fuel oil or gas become obsolete. Also, the risk of contaminations by escaping fuel oil or the already existing risk of explosion when gas is used can be avoided.

In this connection, the method according to the invention also affords the possibility of reducing the consumption of fossil fuels to a considerable extent. As compared with this, regenerative energy sources can be utilized more effectively. It has been assumed hitherto, for example, that a decentral energy supply, using a regenerative fuel, such as, for example, wood in a corresponding way, above all, to oil or gas, is not possible. The cause was, in particular, that the transport of wood is highly complicated and wood as a heat energy source occupies a large storage volume. These disadvantages can be avoided, according to the invention, in that the regenerative fuel is burnt in optimized form in a specially designed thermal power station and the energy obtained from it is stored in a storage module according to the invention. The heat energy thus generated can then be made available to the consumer, on demand, within the scope of the method according to the invention.

If the storage unit according to the invention or the storage module according to the invention is used within the scope of the method, then there is advantageously provision for the storage unit or the storage module to be equipped with a control and evaluation unit. By means of the control and evaluation unit, inter alia, a controlled charge and discharge of the latent-heat storage unit is ensured. In this case, however, there is also provision, in an extremely advantageous way, for providing, with regard to the control and evaluation unit, interfaces which allow a transmission and/or remote transmission of the functional data of the storage module. It is thus possible, in a particularly advantageous way, to ensure that a discharged storage module can be exchanged in due time.

A particularly positive further development of the method according to the invention is also that a transport unit is used, on which the latent-heat store according to the invention can be transported to the respective consumer or to the respective energy source. In this case, there is provision, in an extremely advantageous way, for the transport unit used to have a heat-driven drive and for the drive to be fed by the latent-heat store mounted on the transport unit.

If a conventional drive, such as, for example, a diesel engine, is used in the transport unit according to the invention, there is advantageously provision for the heat generated during the operation of the diesel engine to be absorbed via a heat exchanger and to be supplied to the latent-heat storage module according to the invention for filling and/or for the compensation of possible storage losses.

If the transport unit is to be designed as an autonomous transport unit, a Roots or Sterling engine can be used within the framework of the transport unit. In this case, all known transport means, such as, for example, motor trucks, trains, ships, airships, etc., may be employed or used as a transport unit.

Over and above what has been described hitherto, the method according to the invention and, in particular, also the latent-heat storage unit according to the invention are not only suitable for the provision of heat, but also for using the available heat for production of, for example, liquid oxygen or carbon dioxide $CO^2$. Within the framework of this production, there is provision, in particular, for the latent-heat storage module according to the invention to be used, by means of the absorber technique, for cooling the air, in order thereby to separate the $CO^2$ to be produced from the air in the conventional way.

The invention is described in detail below by means of preferred embodiments and with reference to the accompanying drawings, identical reference symbols referring to the same parts in the individual figures.

Figure 2:
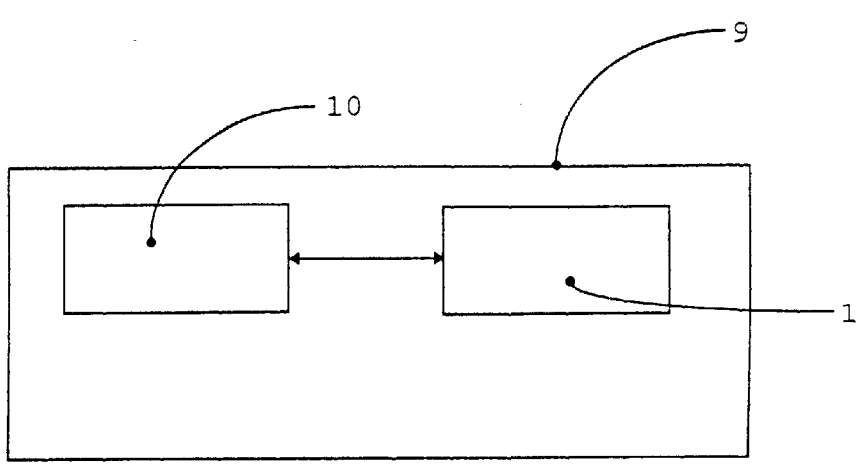
Figure 3:
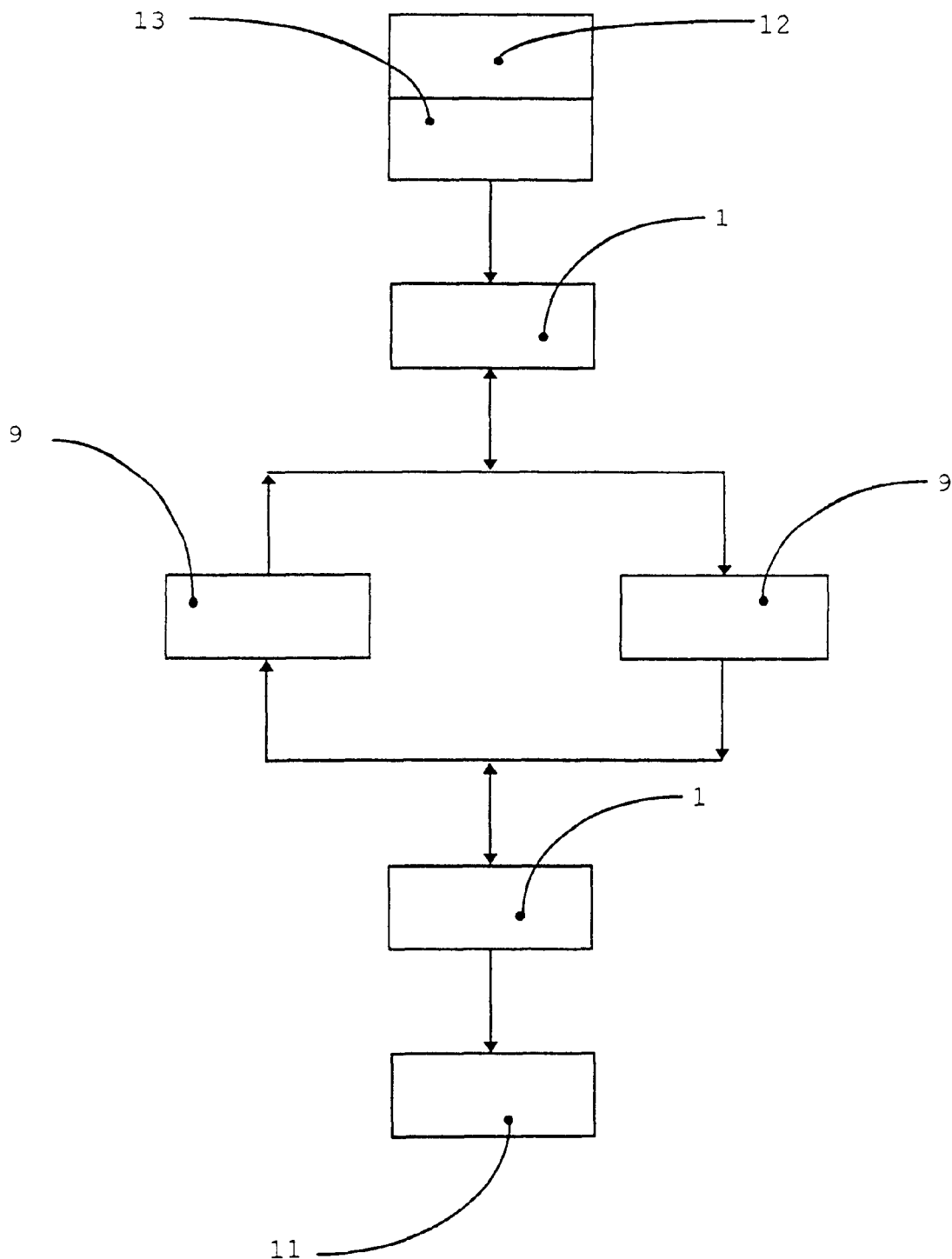

In the drawings:

FIG. 1 shows a highly diagrammatic illustration of a transportable latent-heat storage unit, FIG. 2 shows a likewise highly diagrammatic illustration of a transport unit according to the invention, FIG. 3 shows a simplified illustration of the flow of the method according to the invention.

A block illustration, which shows, in highly simplified form, a latent-heat storage unit 1 or a storage module, may be gathered from FIG. 1.

In a preferred embodiment, the storage module 1 has a heat-insulated double-walled 20-foot container 2. The walls of the container 2 preferably consist of glassfiber-reinforced polyester resin. Between the walls is located a volume which serves as a convection insulator. The walls are coated with aluminum for the reflection of heat radiation. The container 2 is equipped, inside, with a vessel 3 which, in a preferred embodiment, is designed as a perforated, preferably electrically heatable Teflon half shell 3 with a capacity of 20 m³. In a preferred embodiment, the Teflon half shell 3 is located on the bottom of the container 2. The remaining inner space of the container 2 is filled with a storage medium 2a, preferably cycle-resistant sodium acetate.

For the discharge and supply of heat energy in respect of the storage medium, the latent-heat storage unit 1 contains, in a known way, an oil circuit in which heat-exchanging oil, shown at 4 in FIG. 1, is pumped through the sodium acetate 2a, and, depending on the view taken, the oil 4 receives or emits heat, either before or after contact with the storage medium 2a, for example at an oil/water heat exchanger 6.

When the oil 4 receives heat from the heat exchanger 6, said oil passes through porous walls of the Teflon half shell 3 into the sodium acetate and heats the latter by passing essentially uniformly through the sodium acetate. Part of the latent-heat storage unit according to the invention is, for example, also a control and evaluation unit 7 which is designed in such a way that, in addition to the history, that is to say, inter alia, the possible degree of wear of the store and the instantaneous state are indicated and also a prognosis is given as to the duration for which the instantaneous storage capacity is still sufficient or as to what useful life the store still possesses. The control and evaluation unit 7 thus serves for permanently monitoring the latent-heat storage unit 1.

The data thus obtained can be read out externally from the data memory of the storage module 1 via interfaces 8 and used, for example, for correcting the charging or discharging behavior of the storage module. However, there is also provision for equipping the control unit 7 with a selflearning processor unit which puts the control in the position to carry out its own correction from predetermined standard values or from past values. Such a correction may also involve, for example, producing an optimum coordination between the discharge quantity and the charging cycle. Furthermore, the temperature behavior of the storage module 1 may also be optimized in this way.

Via the interfaces 8 provided, for example infrared interfaces, a remote transmission of the data obtained via the control or the evaluation device 7 is also possible. The information can thus be transferred, for example, to an authorized logistics company which can then, as required, carry out an exchange of the storage module 1 or initiates other necessary measures, such as, for example, repairs.

FIG. 2 shows, likewise in a diagrammatic block illustration, a transport unit 9 which can be used extremely efficiently within the scope of the method according to the invention. The transport unit 9 serves, in conjunction with the method, for transporting the latent-heat storage unit 1 from the charging point, for example at a block-heating power station or at a thermal power station, to a consumer 11 (cf., in this respect, also the statements relating to FIG. 3). In an ideal addition to the latent-heat store 1 to be transported, the diagrammatically illustrated transport unit 9 possesses, for independent drive, a Sterling engine 10 which, in order to operate, can make direct use of the heat stored in the latent-heat storage unit 1. This makes it possible, in a highly advantageous way, to have a particularly environmentally friendly transport of the heat storage unit or of the energy stored in it. In this case, the exchange of heat takes place in the conventional way, preferably via an oil/water heat exchanger.

If there is no Sterling or Roots engine 10 used, but, instead, a conventional gasoline engine, there is provision for the excess energy emitted by the engine in the form of heat to be utilized via a heat exchanger in order to compensate possible losses or for the additional topping-up of the heat store 1.

FIG. 3 illustrates a circuit which reproduces the method according to the invention in simplified form. Here, heat generated preferably by a regenerative energy source or a thermal power station is transmitted via heat exchangers to a latent-heat storage unit 1, and the storage unit is loaded onto a suitable transport unit 9. All types of transport units may be envisaged in this context. Thus, for example, even airships, hot-air balloons, trains, multitrucks, etc., insofar as they can be used profitably. The store 1 is transported by means of the transport unit 9 to the heat-energy reception unit 11, as a rule a consumer, set up there and coupled to the heat-energy reception unit 11.

The consumer informs the supply company as to when the store is to be collected or replaced. As already described above, this may also take place in an automated manner. The storage unit 1 is then, in turn, collected by means of a suitable transport means 9 and transported, for renewed topping-up, to the thermal power station 13, which may be fed, for example, by means of a regenerative energy source 12, and is coupled in energy terms to said power station.

It is possible, of course, not only to supply the latent-heat store with heat energy from only one thermal power station 13. Instead, a plurality of weaker heat energy sources 12, 13 may also be tapped, so that their heat energy can also profitably be used or reused. The same also applies in a similar way to the consumers to be supplied. These may themselves be equipped, for example, with storage units which are filled in each case within the scope of the method according to the invention. Lengthy warehousing of the latent-heat storage unit according to the invention on the consumer's premises may then be dispensed with.

It goes without saying that the invention also includes the operation of air-conditioning appliances via heat energy provided by the latent-heat storage unit. Thus, it embraces the use of the heat energy to drive air-conditioning systems for buildings as a whole or office units in buildings.

What is claimed is:

1. A method for the provision of remote heat energy, comprising the followings steps:
    a) storing of at least one directly generated or indirectly formed and storable heat energy in a mobile container-like latent-heat storage unit capable of being warehoused and of being delivered, the latent-heat storage unit comprising a metal hydrate as storage medium,
    b) placing the latent-heat storage unit onto transport unit,
    c) delivering the latent-heat storage unit via the transport unit to at least one heat-energy reception unit, and
    d) placing of the mobile latent-heat storage unit on or in the heat-energy reception unit.

2. The method as claimed in claim 1, wherein storing the heat energy in the mobile latent-heat storage unit according to step a) comprises using dynamic inorganic latent-heat store for storing heat energy.

3. The method as claimed in claim 1, wherein the latent-heat storage unit comprises metal hydrates as storage medium.

4. The method as claimed in claim 3, wherein the metal hydrates are selected from sodium acetate, barium hydroxide and industrial white oil.

5. The method as claimed in claim 1, further comprising the step e) of connecting the latent-heat storage unit to the heat-energy reception unit and the controlled transfer of the heat energy to the heat-energy reception unit.

6. The method as claimed in claim 5, wherein the transfer of the heat energy comprises using a heat exchanger.

7. The method as claimed in claim 1, wherein the heat energy in the mobile latent-heat storage unit according to step a) comprises receiving and supplying storable heat energy from various heat energy sources.

8. The method as claimed in claim 1, wherein the delivery of the storage unit according to step c) comprises at least one of sequential delivery of the heat energy of the latent-heat storage unit to a plurality of supply units and modular placement of the latent-heat storage unit.

9. A latent-heat storage unit for provision of remote heat energy to a heat energy reception unit comprising a container configuration, comprising both standing and transport functionality, and wherein the latent-heat storage unit further comprises a metal hydrate as storage medium.

10. The latent-heat storage unit as claimed in claim 9, comprising means for ensuring the standing and transport functionality both in a storage state and in a discharge state.

11. The latent-heat storage unit as claimed in claim 9, wherein the latent-heat storage unit comprises a control and evaluation unit for determining the functional state of the latent-heat store, the control and evaluation unit comprising interfaces for at least one of the transmission and remote transmission of the functional data.

12. A transport unit for the mobile delivery of heat energy to distant locations for provision of remote heat energy to a heat energy reception unit, comprising:

a transport means for transporting at least one container-like latent-heat storage unit capable of being warehoused and of being delivered, including a metal hydrate as storage medium, the transport means having a heat-driven drive.

13. The transport unit as claimed in claim 12, wherein the heat-driven drive comprises a Roots or Stirling engine.

14. The method as claimed in claim 1, comprising using the stored heat for production of at least one of liquid oxygen and carbon dioxide.

15. A device for carrying out a method as claimed in claim 14, comprising a latent-heat storage unit comprising a container configuration comprising both standing and transport functionality and a device for at least one of the production of liquid oxygen and for the production of carbon dioxide ($CO_2$).

16. The device as claimed in claim 15, wherein the production of the liquid oxygen and the carbon dioxide ($CO_2$) takes place via an absorber technique.

* * * * *